United States Patent [19]
Henis

[11] 3,983,021
[45] Sept. 28, 1976

[54] NITROGEN OXIDE DECOMPOSITION PROCESS

[75] Inventor: Jay M. Henis, St. Louis, Mo.

[73] Assignee: Monsanto Company, St. Louis, Mo.

[22] Filed: June 9, 1971

[21] Appl. No.: 151,396

[52] U.S. Cl. .............................. 204/164; 423/212; 423/213.2
[51] Int. Cl.² .......................................... B01K 1/00
[58] Field of Search .................... 23/220; 204/164; 423/212, 213

[56] References Cited
UNITED STATES PATENTS

| | | | |
|---|---|---|---|
| 3,179,488 | 4/1965 | Appell | 423/213 |
| 3,316,057 | 4/1967 | Howk et al. | 423/213 |
| 3,524,721 | 8/1970 | Stephens | 423/213 |

Primary Examiner—F.C. Edmundson

[57] ABSTRACT

The removal of nitrogen oxides from gases by solids contact and electric discharge.

26 Claims, 1 Drawing Figure

U.S. Patent  Sept. 28, 1976  3,983,021
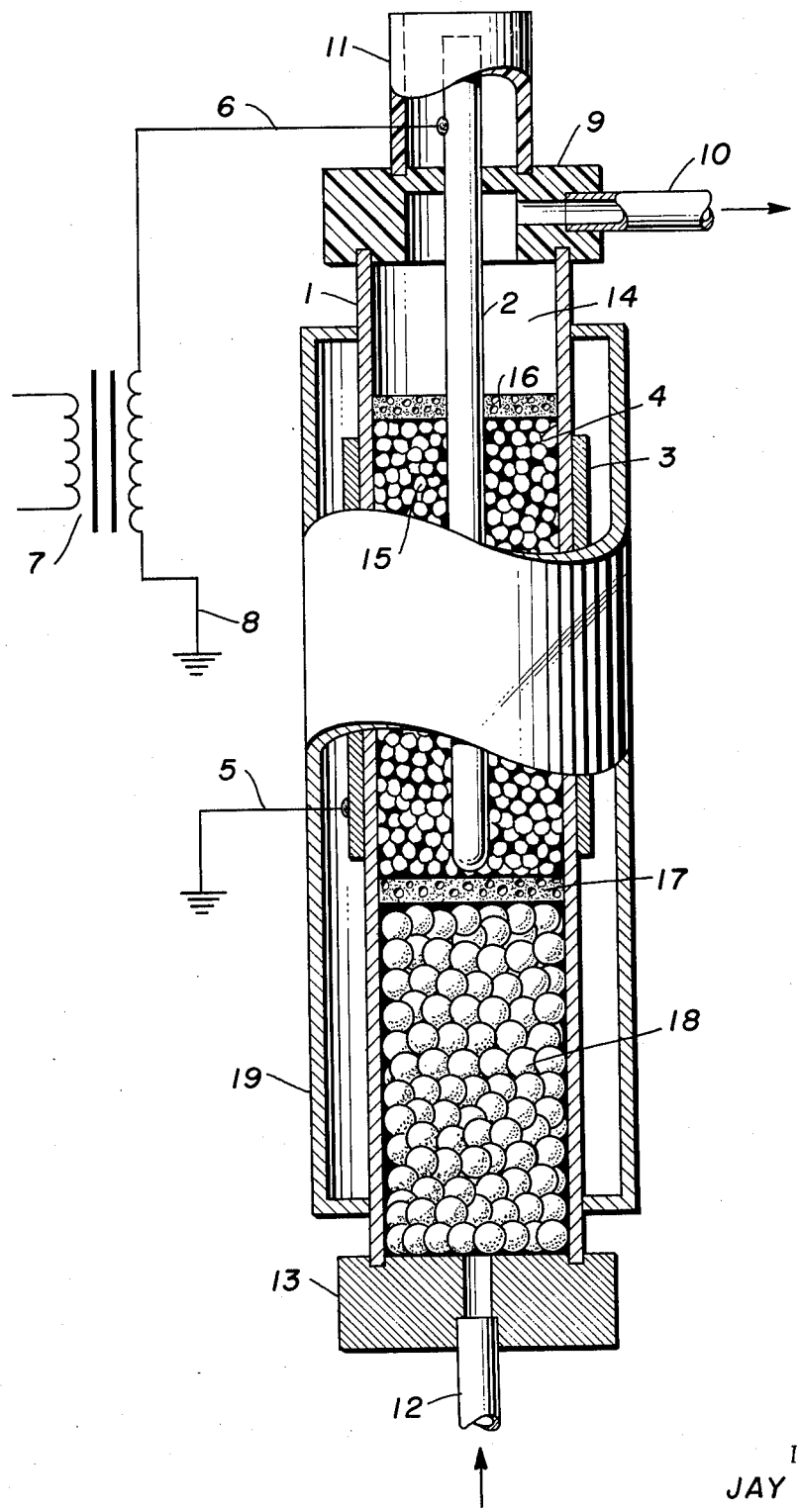
INVENTOR.
JAY M. HENIS
BY Joseph S. Kennedy
ATTORNEY

NITROGEN OXIDE DECOMPOSITION PROCESS

The present invention concerns the decomposition of nitrogen oxides in plasmas in contact with surfaces which facilitate the decomposition.

Nitrogen oxides, especially NO, are common constituents of the exhaust gases issuing from hydrocarbon and coal combustion processes, examples of which include those of gasoline and other internal combustion engines, diesel engines, power plants, incinerators, etc. The exhaust gases from such processes commonly contain $N_2$, $CO_2$, and $H_2O$, along with lesser amounts of CO, $H_2$, nitrogen oxides, unburned hydrocarbons, and oxygen. Among such constituents, nitrogen oxides, carbon monoxide, and unburned hydrocarbons are undesirable from an air pollution standpoint. There are various proposed ways of removing carbon monoxide and unburned hydrocarbons from exhaust gases, but it is proving difficult to find satisfactory and practical methods for removing nitrogen oxides from exhaust gases. It is advantageous to have a method of removal of nitrogen oxides which does not produce other undesirable pollutants or products, and, depending upon location and relation to other pollution removal means, it may be desirable that the products not cause problems with the means being used to remove hydrocarbons or other pollutants. It is also desirable that the means be a catalytic or similar means which does not involve a co-reactant which would be used up in the process, since many pollution control devices by their nature should be suitable for long term use without replenishment of components. Ideally, the removal of nitrogen oxides would be accomplished by decomposition of NO involving only nitrogen and oxygen as products, e.g.,

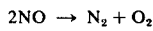

$$2NO \rightarrow N_2 + O_2$$

In certain cases the oxygen produced via the decomposition may undergo secondary oxidation reactions. In general in the present invention the nitrogen oxides present in the exhaust are converted to molecular nitrogen as the principal nitrogen containing product. When the foregoing reaction is referred to herein, it is to be understood that the oxygen may undergo secondary reactions.

SUMMARY OF INVENTION

It has been found that nitrogen oxides can be effectively decomposed to nitrogen and oxygen in a dilute discharge plasma in contact with surfaces of materials which are not consumed in the process. The materials involved have specific chemical and/or physical properties that make them effective in promoting the decomposition in the presence of dilute plasma. Some of the preferred solids exhibit maximum effectiveness when they have a relatively high specific surface area, but, some of the preferred solids give excellent results with relatively low specific surface areas.

The FIGURE is an illustration of an apparatus suitable for carrying out the decomposition process of the present invention.

In the procedure of the present invention gases containing the nitrogen oxides are generally conducted through an electrical discharge zone containing solids (of appropriate material) presenting surfaces for the gases to contact. Generally such solids are a bed of solid particles in the form of spheres, cylinders, granules or other formed shapes, but various monolithic or other porous or reticulated structures permeable to gases can also be employed. The solids are preferably so disposed in the discharge zone that the gas being treated is simultaneously exposed to the discharge and to the solids. However it is within the broader aspects of the invention to separate the discharge and gas-solid contact, either in time or location, and still obtain useful results from the utilization of both the discharge and the solids in the same process. The creation of a plasma in the gases, of course, does not depend upon the presence of the solids. The electrical discharge will be such as to provide a degree of ionization in the discharge zone sufficient to effect a marked decomposition of the nitrogen oxides under the conditions employed with a reasonable sized reaction zone and time. In practical use it is contemplated that the degree of ionization, power dissipation, and other conditions be such that a major portion of the nitrogen oxides are eliminated from the gas stream with accompanying conversion of the nitrogen oxides to nitrogen. In general to achieve good ionization conditions will require energy expenditures of at least 0.1 watt per $cm^3$ of reaction zone space, and more commonly at least 0.1 watt per $cm^3$, while the expenditure is not apt to be over 200 watts per $cm^3$, although there is no particular upper limit so long as there is not a break into a thermal arc under the conditions employed or inability to dissipate the heat generated with resulting excessive temperature conditions.

As is generally recognized, a plasma is an energetic gaseous mixture of ions and electrons which can also contain excited neutral atoms, molecules and radicals. A dilute plasma is generally a non-self-sustaining discharge whose current-voltage characteristics are positive. A dilute plasma is characterized by relatively low electron currents, low gas kinetic temperatures, and it is generally true that the electrons and gas molecules are not in thermal equilibrium in a dilute plasma. For example, the gas kinetic temperature may be 100°–500°C while the electron temperature (as characterized by the kinetic energy of the electrons) may be greater than 5000°K. Such discharges require high externally applied electric fields to accelerate the electrons to sufficiently high energy to ionize molecules and maintain the discharge. Common examples are direct current and alternating current corona, high pressure glow, radio frequency and microwave discharges. The degree of ionization for such plasmas depends upon the conditions of the discharge but is greater than would be expected from its gas kinetic temperature. An atmospheric pressure arc or self-sustaining thermal plasma is generally a highly ionized plasma, involving a discharge with negative current-voltage characteristic in which the molecules and electrons are essentially in thermal equilibrium with each other. Such a discharge is characterized by relatively high electron currents and gas kinetic temperatures between 5000° and 10,000°K (See Gaseous Electrons, J. C. Cobine, Chapter 9, Dover Publications Inc., New York, 1958). Discharges involved in such arcs do not require large externally applied electric fields for their maintenance.

Ordinarily the type of plasma utilized herein, i.e., energetic gaseous mixtures of ions and electrons, is produced by an electrical discharge between a pair of electrodes which are separated from each other by at least one electrically insulating layer of dielectric such as glass or quartz, usually adjacent to or in contact with one of the electrodes. The discharge occurs between such electrodes of different potential which are separated by a gas. At a particular potential difference, depending upon the electrode distance, the gases present and other factors, there occurs a sharp increase in current flow between the electrodes to a value of the order of milliamperes, resulting from the electric field being strong enough to provide the naturally occuring electrons in the gas with sufficient energy to ionize neutral molecules upon collision. The current flow between electrodes can be made to increase still further by increasing the voltage difference until a point is reached at which there would occur a sudden increase in current to the order of many amperes and a corresponding drop in voltage. The type of plasma produced under these conditions is much more highly ionized than that described and is generally called a high current arc or a thermal discharge. The discharges utilized herein generally involve relatively low currents, usually of the order of milliamperes per square centimeter of electrode surface or less, and relatively low degrees of ionization. The discharges include those commonly known as corona, glow, electrodeless and ozonizer discharges. The useful plasmas include dilute plasmas, which includes those sometimes termed cold and hybrid plasmas, which are essentially relatively low temperature media. Thermal arcs whose temperatures lie in the range of 5000° to 50,000°K with kinetic energies of its constituent molecules, ions, and electrons being in equilibrium with the temperature are not generally suitable for the purposes of this invention. The gas kinetic temperatures of the plasmas employed herein generally range from ambient to hundreds of degrees, considered as an average of the temperature of the entire volume of gases involved. When oxygen is present, kinetics are such at excessively high temperatures that nitrogen and oxygen react to produce nitrogen oxides. In corona and ozonizer type discharges, and dilute plasmas in general, the degree of ionization is much greater than would be calculated from the gas kinetic temperature, and is maintained by the large electric fields present. The average temperature of the entire volume is still relatively low. The present process for the decomposition of NO is generally operated at gas kinetic temperatures of 0° to 1000°C or so, considering average temperatures as measured for example, by a thermocouple in the reaction zone, or perhaps up to 1200°C or so allowing for the increase in the temperature of the gas mixture caused by the energy dissipated in the gas by the discharge. The temperature employed in practice will to some extent depend on the temperature of the exhaust stream involved, and this can to a large extent be varied by the position of the discharge zone in the exhaust train, or by the use of cooling or heating means. However, because of the kinetics of the decomposition reaction, and the high temperature properties of materials, it will not generally be desirable to exceed the stated temperature range by much, and certainly not to go over 2000°–2500°C. While average temperatures are referred to herein, this contemplates an average of the gas volume where reaction is occuring, and not an average of a number of hot spots or thermal arc paths where thermal reactions occur at extremely high temperature, constituting the predominant reaction, while little reaction occurs in the balance of the reaction zone.

In general the present invention can use any type plasma which is effective to decompose NO to oxygen and nitrogen in the absence of oxygen and without employing high surface areas; and possibly extend the range of useful plasmas by the effectiveness of surfaces in facilitating the decomposition. The desired reaction will occur if a suitable plasma is employed, no matter how generated. In electrical discharges this is primarily by generation of electrons of the proper energy to ionize gas. Usually such electrons must have at least 9 to 11 electron volts, and possibly 15 electron volts or more. The methods of generation can include a modified corona discharge, a spark gap discharge (Inductively coupled), a radio frequency discharge, microwave discharge, and combinations of the foregoing.

Some types of electrical precipitators involve electrode wires of relatively small diameter separated by relatively great distances, and under the electrical conditions employed involve a small corona area around the wire and little or no ionization elsewhere. In such precipitators small solid particles are charged by electrons or ions in the gas and are then attracted to the charged electrode. They are removed by purely physical means, no chemical change or reaction having taken place. From a practical viewpoint an apparatus having such characteristics and employed in the usual manner would require (since it involves power density of about 0.001 watt/cc.) an unreasonably long reaction zone to conduct a plasma reaction of the type involved here because of the substantial volume where no reaction would occur, and because of the relatively low power density of such devices. Under the voltage and power density requirements of this invention, such precipitation devices would break down.

The apparatus employed in the exemplifications described herein employs electrodes separated by a gap containing gas subject to ionization. Considerable variation in the arrangement of the electrodes is possible, although there may be advantages in particular arrangements. The electrodes are generally employed with a considerable difference in AC potential, for example from 5000 to 40,000 or more volts with a particular embodiment described herein. Such potential will vary with the size and spacing of electrodes, resistance in the circuit, temperature, etc. A particular illustrated embodiment utilizes a dielectric, e.g. glass, wall between the electrodes as a resistance. Other electrical means can be employed to have inductance or impedance in the circuit which will serve as a resistance, but the nature of the discharge will then be altered from high pressure glow (modified corona) to a spark type discharge. For standard corona disclosures alternating or direct current can be employed but alternating current is generally preferred for this invention because of the presence of the dielectric barrier between the electrodes. The plasmas can be used in general with both low and high frequency, including any frequency from zero (dc) up to microwave frequency. As the frequency changes the electrode arrangement also must change, and in the case of radiofrequency and microwave discharges, no central electrode is necessary. It will be recognized that plasmas are generated by a potential difference or electric field gradient in or across a zone containing gas to cause a discharge therein, rather than a potential gradient outside the gas containing zone. For example, if all the particles in the reaction zone were at the same dc potential, no discharge would occur since there would be no electric field gradient. The reactions desired herein do not depend upon or involve catalyzing or energizing gases, droplets or particles to an ignition point, nor involve combustion or burning of components.

It is also feasible to use a procedure in which the voltage is applied to the electrodes in intermittent manner or pulses, rather than continuously, thereby permitting a short time interval for ions or activated species to react before being subjected to further activating conditions. The gases can also be subjected intermittently to electric discharge conditions by being transported through spaced-apart zones where electrical discharge occurs. The use of voltage pulses has an advantage in the efficiency of power usage, although this is offset to some extent by the added cost of converting ordinary continuing voltage to such pulses.

The silent electric discharge reactor shown in the FIGURE includes a dielectric tubular pipe 1 containing a concentric inner electrode 2, and having mounted on its outer surface a conductive covering 3 which together with the wall 4 of said pipe 1 forms an outer electrode assembly. The conductive covering 3 is connected to ground by lead 5. The inner electrode 2 is connected by lead 6 to the high voltage secondary of transformer 7 which is grounded by lead 8. The inner electrode 2 is insulatingly attached to the tubular pipe 1 by teflon gaskets 9 through which a side tube 10 is inserted to provide for exit of the gas stream. Sleeve 11 is of a dielectric material to prevent contact with the upper end of electrode 2. There is an inlet pipe 12 at the other end of tube 1, which is also fitted with a gasket 13 which can be of metal or dielectric material. The annular passage 14 between inner electrode 2 and wall 4 forms a discharge chamber in which packing materials 15 can be disposed. The packing material can be held in place by porous dielectric baffles 16 and 17, and below baffle 17 additional packing material 18 can be disposed which is generally of a different type than 15, although it can be the same. The reactor can be equipped with a jacket 19 for heating purposes. The exit pipe 10 is ordinarily connected to a sampling box which has appropriate valve means and side tube attachments for pressure reduction and forming a side stream which can then be analyzed in a quadropole moss spectrometer. The packing material 15 is generally a high surface area material or other type of material to facilitate the decomposition, while the material 18 is ordinarily only a contact material, e.g. ceramic spheres, for heat transfer purposes, although the same materials used for the 15 packing can be employed as the 18 material.

The illustrated apparatus can be used for a single pass of the gases through the discharge zone. However, if desired, it can be adapted for recycling part or all of the exit gases through the discharge zone or part thereof by recycling part or all of the exit gases to inlet pipe 12 or as a side feed at any point along pipe 1, either before or in the discharge zone. In the illustration the high voltage lead is to the inner electrode. The voltage leads can be reversed, but for operator safety it is preferred to have the high voltage on the inner electrode.

In general the plasma decomposition reaction in accordance with the present invention is ordinarily accomplished by passing the nitrogen oxide containing stream through a narrow elongated zone for plasma formation, such as for example the annular space between two concentric cylinders or tubes used as electrodes. The gap between the elctrodes can vary widely, although generally distances no greater than 40 mm. are employed, and can range down to less than 1 mm. The most suitable distances are generally in the range of 2 to 8 mm. The gap between the electrode contains materials as described herein. When the electrodes are metal as might be the case in a spark gap type discharge, the metal can be any metal generally used for electrodes. When the electrode employes a non-conductive surface, the surface can be glass, quartz, or other dielectric material, and various semiconductor materials can also be used. It is generally preferred that one of the electrodes be bare metal to lessen electrical resistance and increase power dissipation. Various sets, or a multiplicity of electrodes, can also be used. In the event that a pair of bare metal electrodes are used, the problems of arcing are increased, but this can be overcome by use of relatively large electrode spacing, evacuation of the discharge zone, by including resistance or inductance in the electric circuit, by arranging for solids to be present between the electrodes which are constantly in motion, and hence making and breaking electrical pathways, or suitable combinations of the foregoing. Various shapes and sizes of reactors can be used, employing various shapes and sizes of electrodes, and the reactors can be arranged in horizontal, vertical or other direction and adapted for continuous or batch operation.

The mechanism of the reactions involved in the decomposition process of the present invention are not completely understood but are believed to involve some of the following:

I

1. $N_2$ + Discharge → $N$ + $N$

2. NO + Discharge → NO* (excited)

3. NO* + Surface → NO (Adsorbed)

4. N + NO(Adsorbed) → $N_2$ + O(adsorbed)

5. O (adsorbed) + O (Adsorbed) → $O_2$(adsorbed)

6. $O_2$ (adsorbed) → $O_2$ desorbed

II

7. $N_2$ + Discharge + Surface → N + N

8. N + NO → $N_2$ + O

9. O + O + M → $O_2$ + M

III

10. $N_2$ + discharge → N + N

11. NO + discharge → NO* (excited)

12. NO* + Surface → NO (adsorbed)

13. NO (adsorbed) + NO (adsorbed) → $N_2$+$O_2$(adsorbed)

14. $N_2$ adsorbed + $O_2$ (adsorbed) → $N_2$ + $O_2$(adsorbed)

15. NO (adsorbed + NO* → $N_2$ + $O_2$

16. NO (adsorbed) + N → $N_2$ + O

In the above reactions, $N_2$ is molecular nitrogen; $O_2$ is molecular oxygen; NO is nitrogen oxide; NO* is excited nitrogen oxide; N is nitrogen atoms; O is oxygen atoms; and M is any third body.

In addition to the above cited reactions in various combinations it is also possible that under certain discharge conditions the reaction of the Nitrogen and Oxygen containing ions, radicals and excited molecules may occur at or near the surfaces to enhance the decomposition of NO, and it is to be understood that the above reactions are not necessarily preferred or even required for the operation of the invention described herein. The role of the surface can be pictured as providing a template for adsorption of atoms and molecules and their subsequent reaction. Nitrogen apparently takes part in the reaction and it is considered advantageous to have nitrogen present during the discharge reaction. Generally nitrogen constitutes 50 to 80% or so by volume of the gases being treated to remove NO in accord with the present invention, and the procedure will, of course, work very well with up to 100% of the entering gas, other than nitrogen oxides, being nitrogen. Oxygen, of couse, is involved in the decomposition process as one of the products, and its presence affects the reaction. Whenever possible, it is preferred for maximum effectiveness to keep the oxygen content to 3% or less by volume of the gases entering the reaction zone. The presence of higher amounts of oxygen has been found to be a problem in prior known procedures for decomposing nitrogen oxides. When oxygen concentrations of greater than 3% are present in combustion exhausts, it is one of the advantages of the present procedure that the use of suitable surface contact makes it possible to tolerate relatively high concentrations of oxygen, for example up to 5% by volume, and in the range of 5 to 12% by volume or so, and to obtain substantial decomposition of the nitrogen oxides, and even concentrations of oxygen up to the 20% or so found in air and higher and still obtain significant decomposition of nitrogen oxides under certain conditions. In general it is definitely advantageous to keep the oxygen content below 12%.

A wide variety of solids can be used for the contact surface in the present invention. However, the materials useful for such purposes in general have particular characteristics in common. In general such surfaces are capable of some kind of interaction with NO or other gases in the gas stream. Many of the useful materials have relatively high specific surface areas, and a significant degree of porosity. By specific surface area is meant the surface area per gram as measured by the standard BET (Brumauer-Emmett-Teller) method using nitrogen as the adsorbate. Among the whole spectrum of materials which can be used, one finds materials having specific surface areas in the range of 0.01 to 800 square meters per gram. However, many of the efficient materials have specific surface areas of at least 5 square meters per gram. Since a surface phenomenon seems to be involved, it appears that some gas components are adsorbed on the surface, if only temporarily, for the reaction to occur. There are various ways in which gases can interact with a surface, including strictly physical adsorption, chemisorption, etc. Surface area is probably less significant in some types of interaction, e.g. possibly chemisorption, than in oher types. Chemisorption can be defined as that type of adsorption in which there is rearrangement of electrons of the reacting gases and solids with formation of chemical bonds between the gas and solid surface; it can be regarded as a chemical reaction which is ordinarily restricted to the surface of the adsorbent. Physical adsorption is that adsorption caused by forces of molecular interaction which embrace permanent dipole, induced dipole, and quadripole forces, and is the type of adsorption frequently referred to as van der Waals adsorption. The present procedure may involve both physical and chemisorption, as well as types of adsorption involving aspects of both of the foregoing as the gases go into or onto the solids.

In the examples herein, 70 grams of solids is representative of the amounts usually employed. At 0.01 square meters/gram specific surface area, this would be 0.7 square meter surface, and at 5 square meters/gram, would be 350 square meters, and 300 square meters/gram would be 21,000 square meters. Two liters/minute, and 6 liters/minute are representative of the gas flows used herein, and it can be seen that there is a wide variation in the total surface area of the solids that can be selected to treat such gas flows. This will be influenced by reactor design, temperature, discharge, etc. as well as the particular solid, but ordinarily at least half a square meter or so of surface of most solids would probably be involved in treatment of gas streams under the conditions illustrated herein.

In one particular aspect of the present invention, a dilute plsma is formed in a gas stream at ambient pressure, the gas stream containing nitrogen, no more than 5% by volume oxygen, and a small amount of NO, and decomposing the NO to nitrogen and oxygen. This can be done to some extent in the absence of the type of contact solids taught herein, provided the oxygen content is maintained below the stated value, but results are better with particular solids as taught herein.

In the procedures described herein, some of the gases may be more or less permanently retained in or on the solids. However, some temporary adsorption of gases may also be involved, and this may suffice for any surface interaction needed to effect the nitrogen oxides removal described herein. As used herein, permanent adsorption refers to a more or less irreversible retention of the gas on the solid, in the absence of some change such as heating to cause desorption, i.e., a type of retention in which the gas is not readily desorbed. Temporary adsorption is adsorption in which the gases are not permanently retained, but are readily desorbed. Materials of the type used herein may be capable of a certain degree of adsorption even in the absence of plasma conditions. This type of adsorption is referred to herein as regular adsorption. For the most part, the regular, permanent adsorption by such materials of the gases of interest herein is negligible or very small, although such materials are operative even if such adsorption is present. The amount of regular, temporary adsorption is unknown, since it is difficult to measure, but may be fairly significant with some materials. Surprisingly, in the present invention it has been found that a dilute plasma induces a significant amount of adsorption of gases by a number of materials. The adsorption of gases by materials in the presence of an electric discharge is referred to herein as induced adsorption. This induced adsorption phenomenon observed with No is out of the ordinary in that it is observed only to a lesser degree or not at all with a number of other gases. The measured induced adsorption for the most part appears to be a permanent adsorption. The gases adsorbed (as determined by measurements on influent and effluent streams as described herein), appear to be retained on the surface indefinitely, unless the surfaces are heated or otherwise altered to cause desorption. As noted above, the amount of temporary adsorption is difficult to measure. However, the amount of temporary induced adsorption may be relatively large in the case of some of the materials employed herein. It will be noted that in some of the procedures herein the percentage adsorbed is reported separately from the percentage decomposed. If, in such cases, the decomposed material were adsorbed prior to decomposition, the true adsorption would be the sum of the decomposition and adsorption figures. Thus the adsorption figures herein are not always directly comparable, as more decomposition of NO was involved in some procedures than others. However, most of the materials utilized herein gave a measured adsorption (not counting decomposition) of at least 0.0001 liters NO per minute, with about 75 cc. of the contact material, and employing a 2 liter/minute flow rate of a stream containing 0.15% NO, and a measured power dissipation of 80 watts, and some materials had adsorption rates better than 0.001 liters per minute under such conditions. It is to be noted that this adsorption is relatively independent of the NO concentration, within broad ranges of NO concentration. It should also be noted that the adsorption capacity of some of the materials is fairly large, as in some cases procedures have been run for weeks or a month at a time, with some fall off in NO removal, but still having substantial decomposition or adsorption after such times. Adsorption at a rate of 0.001 liter per minute for 30 days would result in adsorption of 43 liters of NO. In view of the relatively low concentrations of NO in exhaust gases, it can be seen that the described materials have an appreciable adsorption capacity with respect thereto. While there are advantages in use of materials with adsorption capability, some materials with only fair adsorption capability are better with respect to NO decomposition than some other materials of extremely high adsorption capability. Moreover, with some materials an electrical discharge does not induce a greater adsorption than would occur in the absence of such discharge, yet some such materials still show a good decomposition capability. As discussed herein, oxygen is one of the products of the decomposition reaction, and its presence in the effluent can be measured. However, it appears that oxygen may also be retained in or on the contact material to a varying extent. While the significance of this is not completely understood, there may be advantages in utilizing materials which permit the desorption or migration of such oxygen, if the presence of oxygen affects the availability of particular surfaces for the NO decomposition.

The present process is not pressure dependent, although it will ordinarily be practiced at pressures within the range of 10 mm to 10 atmospheres. Ambient pressures are suitable. Pressure affects some types of electric discharge, and also affects the kinetics of some reactions, but the present process can be practiced over a broad range of pressures as stated.

In the present invention there are advantages in utilizing contact materials which are not consumed or burned in the reaction. Of course materials which react only in a catalytic sense, without any permanent or irreversible reaction, are not used up. Many of the materials utilized as contact materials herein are relatively inert so far as permanent chemical reaction is concerned, but aside from consumption of the material, such reactions are not necessarily disadvantageous. Some materials, such as carbon or other carbonaceous materials, can react or burn with generation of carbon monoxide or other undesirable concomitant products. Ideally the present invention produces nitrogen from nitrogen oxides and removes substantially all of the nitrogen oxides from a gas stream without substantial production of undesirable concomitant products.

The materials employed as surface contact material will generally have dielectric properties or be of no more than low conductivity. This is not necessarily an essential property, except to the extent necessary to avoid short circuiting when electric discharge means are utilized to produce the gaseous plasma. However, a number of the suitable materials are metal oxides or salts rather than the pure metals and accordingly of low conductivity. Where pure metals are used, they are generally dispersed on a dielectric surface so that the overall conductivity is still low, and the grains, granules, or other particle forms are essentially non-conductive. Classes of materials which are generally suitable include the aluminum and silicon oxides, e.g., aluminas, silicas, aluminates, silicates, metal aluminum silicates, clays, molecular sieves, diatomaceous earths, etc., as well as similar materials from other materials in the same atomic groups. In general these materials will be employed in one of the forms in which heterogeneous catalysis supports are ordinarily employed in order to have contact with gaseous reactants, e.g. as particles, pellets, a porous structure, a fluidized bed, etc. Various other catalyst materials and the supports therefor will also be useful in the present procedure, although there will be considerable variation in their efficiency. For example, transition metals and metal oxides, including combinations thereof, can be used either dispersed on supports formed of porous particles of other metal oxides, or without dispersal on such supports, further specific examples of such materials including magnesia, thoria, zirconia, titania, hafria, zirconium silicate etc. Various noble metals and their oxides can be employed, e.g., platinum, rhodium, and their oxides.

Nitrogen oxide contaning gas streams were subjected to electric discharge in the reactor illustrated by the FIGURE, employing various packing materials. The reactor, as used in the following procedures had a 6 mm. inner electrode 2, and the inner diameter of the dielectric pipe 1 was 17 mm., making a gap between the electrodes of approximately 5.5 mm. The outer ground 3 was about 32.5 cm. in length, and the glow area extended about 2.5 cm. on each end, making a total discharge zone about 37.5 cm. in length. The volume in the grounded zone was about 75 cc., and about 95 cc. for the total discharge zone. At a space velocity of 1300 reciprocal hours, there is a gas flow in the reaction of about 2 liters per minute, and at 4000 reciprocal hours, about 6 liters/minutes.

A 75 kilovolt transformer was used for the discharge, and the power expenditure in the secondary which was connected to the electrode was measured, and the input was regulated so this was generally in the range of 50 to 80 watts. However, there was considerable power loss in the high voltage cable to the electrode, and this was determined to be approximately half the input by measuring the power loss with open leads, so the power values reported in the procedures herein should be decreased by about one-half to approximate the actual power dissipation in the reactor itself. The current in the secondary was also measured at a point between the secondary and ground, and this also is adjusted in view of the losses in transmission to the reactor.

EXAMPLE 1

Utilizing a gas feed of 0.15% by volume NO, and the balance nitrogen, a discharge was run without external heating in the illustrated reactor at space velocity of 1300 hr.$^{-1}$ with a measured power loss in the secondary of 50 watts. The percentage of NO decomposed was 9.9%. At a measured 80 watts, the decomposition was 18%. When the flow rate was increased to correspond to a space velocity of 4000 hr.$^{-1}$, 3.3% was decomposed at 50 watts, and 4.1% at 80 watts.

EXAMPLE 2

An approximately neutral alumina was used in the reactor, a total of about 80 cc. of the material being used in the discharge zone. The alumina was essentially a gamma alumina. At a space velocity of 1300 hr.$^{-1}$ and measured power dissipation of 50 watts, with an approximate reactor temperature of 100°C., there was an NO decomposition of 19.7% when the entering stream contained 0.15% NO, with the balance Nitrogen. The NO was decomposed at the rate of 0.0061 liters/minute. There was also a permanent adsorption of 59% of the NO. When the measured power was changed to 80 watts, the decomposition was 31.1% and the adsorption 48.7%. At a space velocity of 4000 hr.$^{-1}$, the decomposition was 6.3% at 50 watts, and 9.4% at 80 watts, with adsorptions of 31.8 and 30.9 respectively. The inlet stream was changed to include 1% oxygen, 1% carbon monoxide, and 10% carbon dioxide, and at a 4000 reciprocal hour flow rate, there was then a removal of 31.2% of the NO, 0.0029 liter being removed per minute. With a 1300 hr.$^{-1}$ space velocity, the removal was 75.6%. The alumina (Al-0104-4) employed was further characterized by a total pore volume of 0.323 cc./gram, a macropore volume of 0.119 cc./gram, a surface area of 72 square meters/gram, and containing 0.19% Na.

500°C., with a measured power dissipation of 80 watts (from a 50 Kv transformer) at a velocity of 1900 reciprocal hours. Changing the power dissipation to 54 watts reduced the decomposition to 33.9%. When 1% oxygen, 1% CO, and 10% $CO_2$ were included in the gas, there was a 35.7% NO removal at measured power of 85 watts. With a 0.15% NO concentration and 80 watt power at 500°C., the NO decomposition was 22.8%.

In the above and other procedures, NO is adsorbed on the packing material, and this generally occurs to a greater extent than the decomposition. This can be monitored by measuring both the NO and the oxygen in the effluent stream, with the amount of NO decomposition being determined from the amount of oxygen produced. However, when oxygen is also present in the inlet stream, the monitoring of oxygen production requires determination and allowance for a background value, and only the total NO removal is reported here. Ordinarily the actual decomposition can be approximated by determining the amount of NO adsorbed under the same conditions but in the absence of oxygen, and substracting this value from the total NO removed. In the present procedures it would be preferred to decompose all the NO to nitrogen and oxygen. However, the adsorption of NO on the packing material does keep it from being present as a contaminant in the effluent, and will be a satisfactory method of removal so long as the NO is not readily re-emitted under conditions of use, and up to the time the packing material is saturated. Considering the small amount of NO in exhaust gases, and the fairly high adsorption capacity of some materials, it may be feasible to use materials depending partly on adsorption capacity for NO removal, and still have a sufficiently long life of the material for use as exchangeable cartridge in motor vehicles.

EXAMPLE 3

The illustrated rector was packed with magnesia pellets and nitrogen gas at ambient pressure containing the specified amount of NO was passed through the reactor under discharge conditions with results as reported in the table.

Table I

| Procedure No. | Space Velocity hr$^{-1}$ | Temp. °C | % NO | Power Watts | % NO decomposed | % NO adsorbed | % total NO removal |
|---|---|---|---|---|---|---|---|
| 1 | 1300 | 100 | 0.15 | 50 | 12.7 | 70.1 | |
| 2 | 1300 | 100 | 0.15 | 80 | 47.3 | 36.1 | |
| 3 | 4000 | 100 | 0.15 | 50 | 11.7 | 21.3 | |
| 4 | 4000 | 100 | 0.15 | 80 | 17.6 | 19.8 | |
| 5 | 4000 | 100 | 0.15* | 50 | — | — | 26.1 |
| 6 | 1300 | 100 | 0.15* | 50 | — | — | 80.8 |

*Inlet gas also contains 1% oxygen, 1% CO, and 10% $CO_2$.

When an inlet stream was employed containing 0.2% NO, 5.0% oxygen, and the balance nitrogen, a 35% removal of NO was obtained at a space velocity of 400 hr.$^{-1}$ and measured power dissipation of 80 watts (from a 50 kv transformer) with an approximate temperature of 100°C. With an inlet containing 0.2% NO, there was a 40% decomposition of NO and 17% adsorption at

EXAMPLE 4

A macroporous silica with surface area of 120 square meters per gram was utilized in the illustrated reactor with nitrogen at ambient temperature carrying NO, with the following results:

Table II

| Procedure No. | Space Velocity hr$^{-1}$ | Temp. °C | % NO | Power Watts | % NO decomposed | % NO adsorbed | % total NO removal |
|---|---|---|---|---|---|---|---|
| 1 | 4000 | 100 | 0.15 | 50 | 5.8 | 10.3 | |
| 2 | 4000 | 100 | 0.15 | 80 | 10.9 | 15.5 | |
| 3 | 1300 | 100 | 0.15 | 50 | 32.8 | 20.3 | |

Table II-continued

| Proce-dure No. | Space Velocity hr$^{-1}$ | Temp. °C | % NO | Power Watts | % NO decomposed | % NO adsorbed | % total NO removal |
|---|---|---|---|---|---|---|---|
| 4 | 1300 | 100 | 0.15 | 80 | 45.3 | 26.4 | |
| 5 | 1300 | 100 | 0.15* | 50 | — | — | 23.2 |
| 6 | 4000 | 100 | 0.15* | 50 | — | — | 16.1 |

*Gas also contained 1% oxygen, 1% CO and 10% CO$_2$.

The illustrated reactor was used with a packing of approximately ⅛ inch diameter aluminum oxide balls (Alumdum brand of pure, crystalline granular aluminum oxide), and with a quartz shielded inner electrode, and the outer tube being a heat and chemically resistant glass (Vycor) as usual. With a 1300 reciprocal hour flow rate of a stream containing 0.2% NO, and use of a 50 Kv transformer to give approximately a 0.9 milliampere current in the secondary, there was a 9.3% decomposition of the NO, and 8% adsorption. The procedure was conducted without external heating, so the temperature in the reactor was approximately 100°C. When the temperature was raised to 300°C., there was a 22.2% removal of NO with approximately a 1.1 milliampere secondary current. At 250°C and 1465 hr.$^{-1}$, there was 12.9% NO decomposition and 45.3% adsorption at a 0.6 milliampere current. When the current was shut off, the overall NO removal dropped to 10.8%.

EXAMPLE 5

The illustrated reactor was packed with 95 cc. of an alumina catalyst support, and 6 inches of granular aluminum oxide balls below such support. The aluminum oxide catalyst support (KA 201) had a surface area of about 230 m$^2$/gram, and 67.8 grams was employed. Employing a nitrogen feed stream with a small amount of NO, results were as follows:

Table III

| Proce-dure No. | Space Velocity hr$^{-1}$ | Temp. °C | % NO | Power Watts | % NO decomposed | % NO adsorbed | % total NO removal |
|---|---|---|---|---|---|---|---|
| 1 | 1900 | 100 | 0.2 | 85 | 60.2 | 29.2 | |
| 2 | 1900 | 470 | 0.15 | 45 | 20.8 | 0 | |
| 3 | 1900 | 470 | 0.15 | 85 | 39.4 | 0 | |

EXAMPLE 6

The illustrated reactor was packed with 50 grams of an alumina catalyst support (Br 1570-02), 8 × 14 mesh, having an approximate 100 cc. volume. With a nitrogen stream containing 0.2% NO, results were as follows:

Table IV

| Proce-dure No. | Space Velocity hr$^{-1}$ | Temp. °C | % NO | Power Watts | % NO decomposed | % NO adsorbed | % total NO removal |
|---|---|---|---|---|---|---|---|
| 1 | 4000 | 100 | 0.2* | 80 | — | — | 50% |
| 2 | 5000 | 100 | 0.2 | 80 | 20.8 | 32.3 | |
| 3 | 5000 | 100 | 0.2* | 80 | | | 55% |

*Inlet stream also contained 1% O$_2$, 1% CO, and 10% CO$_2$.

EXAMPLE 7

A silica gel (Davison SG-59) was utilized in the illustrated reactor with a nitrogen stream containing a small amount of NO, with results as follows:

Table V

| Proce-dure No. | Space Velocity hr$^{-1}$ | Temp. °C | % NO | Power Watts | % NO decomposed | % NO adsorbed | % total NO removal |
|---|---|---|---|---|---|---|---|
| 1 | 1300 | 100 | 0.15 | 50 | 9.3 | 38.3 | |
| 2 | 1300 | 100 | 0.15 | 80 | 28.0 | 22.5 | |
| 3 | 4000 | 100 | 0.15 | 50 | 9.9 | 10.3 | |
| 4 | 4000 | 100 | 0.15 | 80 | 16.9 | 19.6 | |
| 5 | 4000 | 100 | 0.15* | 50 | | | 13.2 |
| 6 | 1300 | 100 | 0.15* | 50 | | | 32.8 |

*Inlet gas also contained 1% O$_2$, 1% CO, and 10% CO$_2$.

EXAMPLE 8

A silica alumina (Houdry, S-90) was utilized in the illustrated reactor, and gave an 18.9% decomposition and 33.5% adsorption, utilizing a nitrogen stream at 1300 hr$^{-1}$ and containing 0.15% NO with a measured power dissipation of 50 watts. The decomposition was 28% with 80 watt power. With a stream also containing 1% O$_2$, 1% CO, and 10% CO$_2$, the total NO removal was 33.6%.

EXAMPLE 9

The illustrated reactor was packed with a zirconium silicate support having a surface area of about 0.1 m. per gram. With a nitrogen stream containing a small amount of NO, results were as follows:

Table VI

| Procedure No. | Space Velocity hr$^{-1}$ | Temp. °C | % NO | Power Watts | % NO decomposed | % NO adsorbed | % total NO removal |
|---|---|---|---|---|---|---|---|
| 1 | 1300 | 100 | 0.15 | 50 | 75.6 | 12.2 | |
| 2 | 1300 | 100 | 0.15 | 80 | 79.6 | 16.9 | |
| 3 | 4000 | 100 | 0.15 | 50 | 34.5 | 18.2 | |
| 4 | 4000 | 100 | 0.15 | 80 | 61.5 | 12.3 | |
| 5 | 4000 | 100 | 0.15* | 50 | | | 18.4 |
| 6 | 1300 | 100 | 0.15* | 50 | | | 43.9 |

*Inlet stream also contained 1% $O_2$, 1% CO, and 10% $CO_2$.

EXAMPLE 10

A different zircon support was employed, with results as follows:

Table VII

| Procedure No. | Space Velocity hr$^{-1}$ | Temp. °C | % NO | Power Watts | % NO decomposed | % NO adsorbed | % total NO removal |
|---|---|---|---|---|---|---|---|
| 1 | 1300 | 100 | 0.15 | 50 | 47.4 | | |
| 2 | 1300 | 100 | 0.15 | 80 | 68.2 | | |
| 3 | 4000 | 100 | 0.15 | 50 | 10.4 | | |
| 4 | 4000 | 100 | 0.15 | 80 | 16.8 | | |
| 5 | 4000 | 100 | 0.15* | 50 | | | 18.7 |
| 6 | 1300 | 100 | 0.15* | 50 | | | 31.1 |

*Inlet stream also contained 1% $O_2$, 1% CO, and 10% $CO_2$.

Zirconium silicates as employed herein typically have an analysis, $Al_2O_3$, 2.97%; $SiO_2$ 32.33%; $Fe_2O_3$ 0.17%; and zirconium and hafnium oxides (mostly zirconium), 64%.

EXAMPLE 11

An acidic alumina (Engle hard RD-Al-3) of about 449 m$^2$/gram surface area was employed in the discharge reactor, and gave a 15.5% decomposition and 79.5% adsorption of NO with a 50 watt measured power dissipation, at 1300 hr$^{-1}$. With 1% $O_2$, 1% CO, and 10% $CO_2$ also in the inlet stream, there was approximately 100% removal of the NO.

EXAMPLE 12

A molecular sieve material was placed in the reactor, a volume of 95 cc. being used with weight of 58 grams. With a 4000 hr$^{-1}$ flow rate and 0.2 NO in nitrogen, the decomposition at 80 watts measured on the secondary was about 55%. With 2% oxygen added, this changed to about 75%, and then was about 78% for 3 to 4% oxygen.

EXAMPLE 13

The reactor was packed with 85 cc. of an alumina support (Al-0104-4), and used to remove NO from a nitrogen stream containing 0.2% NO. The NO decomposition was virtually complete at a 2 liter/minute flow and a measured current in the secondary of the 50 KV transformer of 4 to 5.6 milliamperes. When oxygen was added in concentration of 1%, 2%, 3% and 6.5% of the inlet stream, the NO removal was in the range of 95–100%. At 9.4% oxygen, the NO removal was about 70%, and at 12.4% oxygen, the NO removal was about 45%. (The analytical procedure differed from that of other examples).

When the reactor employed herein was packed with 95 cc. of silica catalyst support, 50 volts on the primary gave a measured 12 watts power on the secondary and 1.4 milliampere current on the secondary. With the primary voltage at 100, the secondary measured 66 watts and 4.24 microamperes. These measurements were with no gas flow, but did not differ greatly from these with gas flow. With the reactor disconnected from the high voltage lead, a primary voltage of 55 resulted in a 7 watt power measurement in the secondary, with 4.1 milliamperes. Use of 105 volts on the primary gave a primary current of 1.7 amperes, power on the secondary of 21 watts, and current on the secondary of 6.8 watts. The foregoing illustrates that the shielded cable from the secondary to the high voltage electrode uses considerable power.

With some materials it was found that the plasma formation caused a great increase in adsorption capability, e.g. a neutral alumina (KA-201) of surface area about 230 m$^2$/gram, absorbed much more NO in the presence of the electric dicharge. There can be advantages in using materials of such augmented adsorption characteristics in the present invention. The material decomposed 7.7% and adsorbed 33.9% of NO from a nitrogen stream at 50 watts and 4000 hr$^{-1}$.

EXAMPLE 14

Cobalt oxide was used as the packing in the reactor, and a 12.6% decomposition and 22.9% adsorption was obtained at 100°C, 1300 hr$^{-1}$ and 80 watts power.

EXAMPLE 15

When the reactor illustrated herein was packed with carbon, and nitrogen containing NO passed therethrough under discharge conditions, the NO removal was approximately the same as that obtained with no solid present. With 0.2% NO and 80 watts power, about 5% of the NO was removed at 4000 hr$^{-1}$. Carbon monoxide and carbon dioxide were observed in the effluent, and there was no oxygen observed when operating at about 500°C. At temperatures around 100°C., a very small amount of oxygen was produced, but the reaction products were predominantly carbon monoxide and carbon dioxide.

EXAMPLE 16

The illustrated reactor packed with high surface area alumina (KA-201) was utilized at 80 watts and 4000 hr.$^{-1}$ to remove NO from a nitrogen stream containing 0.15% NO. At 100°C. approximately one-third of the NO was removed, with about one-fifth of that removed being decomposed, as determined by the quantity of oxygen produced. The NO feed in the inlet stream was cut off, so that only nitrogen was being fed. The oxygen in the effluent dropped to a fraction of that previously determined, but was still a significant quantity. This demonstrates that the NO was adsorbed, and that it was decomposed on the surface of the solid to produce the oxygen.

EXAMPLE 17

The reactor was set up with approximately 90 cc. (65 grams) of high surface area alumina, and utilized with a 6 liter per minute nitrogen flow rate with 0.2% NO. The NO does not show significant permanent adsorption in the absence of discharge. With 50 watts power, the adsorption was originally about 0.004 liters/minute, and declined to about 0.0025 liters/minute at 30 minutes, and stayed near this value with only a gradual decline in the average value, for 90 minutes. The actual measured values fluctuated above and below this value when measured at time intervals. The discharge was stopped, and the NO measured in the effluent was then slightly greater than that in the feed stream. The nitrogen flow rate was changed to 2 liters per minute and the NO in the feed stream was turned off, and NO desorption was measured as the reactor temperature was raised by heating. The NO desorption varied widely between about 0.0003 liters per minute and 0.003 liters/minute, as the temperature was raised to about 300°C. at 80 minutes, and then to about 0.0058 liters/minute as the temperature was raised to over 400°C. The desorption rate generally responded to increases in temperature and then declined until the temperature was again increased. Oxygen in the effluent was determined as slightly over 0.0001 liters per minute at 50 minutes, approximately 0.0002 liters/minute at 90 minutes, and then rising to 0.0018 liters per minute at 102 minutes as the temperature reached about 480°C.

EXAMPLE 18

Gases were flowed through a ¾ inch internal diameter tube at pressures from 1 to 250 mm at space velocities ranging from 25 to 150 hr$^{-1}$. Microwave power was transmitted from a power supply to a tuned resonant cavity in the tube and the gas passing through the cavity was caused to discharge producing a dilute plasma over a 5 cc. volume discharge zone. Power densities ranging from 20 watts/cc. to 500 watts/cc. were used to obtain 30 to 50% decomposition of NO in a gas stream containing 0.2% NO. Similar decomposition is obtainable employing solid contact surfaces, such as aluminas, under conditions to avoid excessive heating. Radio frequencies can also be employed, e.g. those in the 100 kilocycle to 100 megacycle range.

Various metal oxides can be used as the solid contact material herein, some of which have been exemplified hereinabove, but there will be a wide variation in efficiency for nitrogen oxide decomposition as taught herein. Such oxides are in general catalysts fro some oxidation reactions, but a number of them are often used in unsupported form, or as catalyst supports. Among such materials which can be used, and an example of a crystalline form for such use. are $Cr_3O_3$ (Corundum type), $\alpha Fe_2O_3$ (Hematite), NiO (Bunsenite), CuO (Tenorite), $Co_3O_4$ (Spinel type), $Mn_2O_3$ (Bixbyite), $Mn_3O_4$ (Hausmanite), ZnO (Zinicite), $Pb_3O_4$ (Minium), MgO (Periclase), $ThO_2$ (Thorianite), $CeO_2$ (Fluorite type), $Ag_2O$ (Cuprite type), $V_2O_5$, $TiO_2$ (Anatose), $ZrO_2$ (Fluroite type), $WO_3$, $\gamma$-$Al_2O_3$ (Spinel type), $SiO_2$ (Amorphous), etc. Of course, other crystalline forms can also be used. Pellets of an activated metal oxide are suitable for use herein, such as pellets of activated alumina, beryllia, thoria, magnesia, zincite or zirconia. As is well known in the art, the activated form of these oxides is prepared by the careful dehydration of a hydrated form of the oxide (such as the dehydration of alumina trihydrate at approximately 1000°F) to produce a dehydrated form having a high specific surface area and large internal pore volume. Activated alumina is particularly suitable. The carrier or support can be impregnated with various actives known to be catalytically active for various reactions, and such impregnation may at times be advantageous in the presently claimed procedures. In addition various silicates can be employed herein, including those exemplified hereinabove, along with various other silicas and silicates. Pumice can be used, being a highly vesicular lava or rock composed of complex silicates of aluminum, potassium and sodium. The metal oxides can be used in various forms, e.g., aluminum oxides can be in the form of alumina, hydrated aluminas, or aluminates, and reference is made to Encyclopedia of Chemical Technology, Vol. I, pp. 640–645 (Interscience Publishers Inc., N.Y., Fourth Printing, 1961). As is well known calcination or heating often changes the crystalline form of metal oxides, and heating at about 900°C can produce the $\gamma$-alumina, while temperatures above 1000°C. produce $\alpha$-alumina, and both forms can be used herein. In general most catalyst materials or supports therefor useful in hydrocarbon cracking or reformation reactions have some value in the presently claimed process. There are advantages in using incombustible solids or materials which are relatively inert insofar as any permanent chemical change or consumption in the reaction is concerned. Non-carbonaceous materials are advantageous since it is undesirable to have materials which react with NO or oxygen to produce carbon monoxide which is a pollutant.

In utilizing the contact materials herein, the materials will generally be formed into particles of sizes in the ranges of 1/32 to ⅛ inch or so, although other sizes can be employed, as well as other forms of porous material.

Among the contact materials which have been found useful in the present process are the following:

A neutral $\alpha$-$Al_2O_3$ with intermediate surface area (Hashaw Al-0104);

A neutral $\alpha$-alumina with high surface area and substantial macropore volume (Kaiser KA-201);

High porosity, low density, high purity silica gel (Davison SilicaGel 56–59);

Commercial magnesia support (high pH) (Harshaw Magnesia Mg-0601);

Typical cecidic cracking catalyst (Handry Silica Alumina S-90);

Acidic alumina (Englehard Alumina RD-Al);

High Macroporosity silica gel support (Houdry Macroporous Silica Beads, 9C3 catalyst);

High macroporosity, low surface area zirconium silicate (Norton Zircon 4054).

Additional properties of the supports are set forth in Table VIII below.

TABLE VIII

DESCRIPTION AND PROPERTIES OF SUPPORTS

| Support | Form | Surface Area $m^2/g$ | Particle Density g/cc | True Density g/cc | Total Pore Vol. cc/g | *Macropore Vol. cc/g | Purity | Impurities Present |
|---|---|---|---|---|---|---|---|---|
| Harshaw Al-0104 | 1/8″ tablets | 80–100 | 1.57 | 3.45 | 0.28–0.33 | 0.119 | 99%$Al_2O_3$ | 0.19%Na,<0.04%K 0.009%Cl |
| Kaiser KA-201 | 5×8 mesh spheres | 332 | 1.20 | 3.10 | 0.510 | 0.101 | — | 0.27%Na |
| Davison Silica Gel S6-59 | granules 3–8 mesh | 239 | — | — | 1.15 1.00 | 0.048 | 99.7% $SiO_2$ | — |
| Harshaw Magnesia Mg-0601 | 1/8″ tablets | 28 | 2.0 | 3.6 | 0.20 0.208 | 0.007 | 98% MgO | — |
| Houdry Silica Alumina S-90 | 4mm tablets | 400–410 | 0.84 | 2.4 | 0.77 | — | 86%$SiO_2$ 12%$Al_2O_3$ | 0.1%$Fe_2O_3$-max. 0.2%$Na_2O$-max. |
| Engelhard Alumina RD-AL | 1/16″ extrudate | 449 | 1.18 | 3.12 | 0.528 | 0.147 | — | low soda |
| Houdry Macroporous Silica Beads, 9C 3 catalyst | ~3–6 mm oblate spheres | 140 | 0.82 | 2.25 | 0.776 | 0.134 | >99%$SiO_2$ | <0.1%$Al_2O_3$ <0.1%$Fe_2O_3$ <0.1%$Na_2O$ |
| Norton Zircon 4045 | — | | 0.020 | 3.96 | — | — | 39.9%$SiO_2$ 53.4%$ZrO_2$ +$HfO_2$ | 4.8%$Al_2O_3$ 0.3%$Fe_2O_3$ 0.5%$TiO_2$ 0.1%CaO 0.2%$Na_2O$ 0.8%$K_2O$ |

*Macropore = pores with diameter 700A°.

Among the gases for which the process herein is useful are for example, exhaust gases containing up to about 0.5% NO, 0.5 to 2 or 3% oxygen, 5 to 15% water vapor, 5 to 15% carbon dioxide, 0.5 to 3% carbon monoxide, up to 1 to 2% hydrogen, various hydrocarbons in amounts of parts per million, e.g. up to 500 ppm., and nitrogen for substanitally the balance, or various combinations of one or more of the foregoing along with nitrogen oxides and nitrogen. The present process is particularly suitable for treatment of exhaust gases from gasoline engines, i.e., automobile motors, and such exhaust gases generally have compositions in the above ranges.

EXAMPLE 19

A porous thoria material was used in the reactor under ambient conditions producing a temperature of about 100°C in the reactor, with the following results:

Table IX

| Procedure No. | Space Velocity $hr.^{-1}$ | Temp. °C | % NO | Power Watts | % NO decomposed | % NO adsorbed | % total NO removal |
|---|---|---|---|---|---|---|---|
| 1 | 1377 | 100 | 0.15 | 50 | 21.1 | 60.2 | 81.3 |
| 2 | 1377 | 25 | 0.15 | 0 | 4.5 | 0 | 4.5 |
| 3 | 1377 | 100 | 0.15 | 80 | 25.8 | 69.8 | 95.6 |
| 4 | 4133 | 25 | 0.15 | 0 | 1.5 | 5.0 | 6.5 |
| 5 | 4133 | 100 | 0.15 | 50 | 10.5 | 38.7 | 49.2 |
| 6 | 4133 | 100 | 0.15 | 80 | 19.7 | 34.0 | 53.7 |
| 7 | 4570 | | 0.15* | 50 | | | 37.1 |
| 8 | 1520 | | 0.15* | 50 | | | 89.8 |

*Inlet gas also contains 1% oxygen and 10% $CO_2$.

The thoria used was a thorium oxide in the form of pellets formed by compressing and calcining thorium oxide powder.

EXAMPLE 20

Potassium hydroxide deposited on silica in a 1% amount thereof was utilized in the reactor with the following results:

Table X

| Procedure No. | Space Velocity $hr.^{-1}$ | Temp. °C | % NO | Power Watts | % NO decomposed | % NO adsorbed | % total NO removal |
|---|---|---|---|---|---|---|---|
| 1 | 1300 | 100 | 0.15 | 50 | 43.6 | 45.7 | 89.3 |
| 2 | 3915 | 100 | 0.15 | 50 | 38.0 | 50.6 | 88.6 |
| 3 | 1450 | 100 | 0.15* | 40 | | | 75.7 |

*Inlet gas also contains 1% oxygen, 1% CO, and 10% $CO_2$.

The hydroxide treated silica was prepared by depositing a 1% amount of KOH on a silica (Davison No. 5) having a specific surface area of 800 $m^2$/gram, a pore volume of 0.43 cc/gram, and of −18 +50 mesh size. The potassium hydroxide utilized in the foregoing example is exemplary of metal hydroxides, e.g., alkali and alkaline earth metal hydroxides, which can be deposited on aluminas, magnesias, zirconias, silicates, aluminum or zirconium silicates, other zirconium compounds or other contact materials taught herein, and utilized in the processes and reactors of the present invention.

A number of different contact materials were used in the reactor to remove NO from a dilute nitrogen stream thereof at about 100°C., space velocity of about 4000 $hr^{-1}$, and power input of 40 watts, with results:

Table XI

| Material | % Decomposition | % Adsorbtion |
| --- | --- | --- |
| None | 3.5 | 0 |
| Alumina (KA 201-3) | 7.7 | 34 |
| Alumina (Al 104) | 9.4 | 30 |
| Alumina (Englehard) | 11.9 | 58.5 |
| Alumina (Br 1570) | 23.6 | 49.4 |
| Silica (Pyrex Beads) | 14.3 | 10.3 |
| Silica (SG 59) | 16.9 | 19.6 |
| Silica (Houdry Macroporous) | 10.9 | 15.5 |
| Silica Alumina | 11.2 | 12.6 |
| Zirconium Silicate | 61.5 | 12.3 |
| $PbO_2$* | 3.0 | 46.0 |
| Activated Carbon | ~3 | ~10 |
| Cobalt Oxide | ~4.0 | ~10.0 |
| Thoria | 19.7 | 34.4 |
| H treated Mol Sieve | 3.5 | 36.4 |
| Na treated Mol Sieve | 3.9 | 30.9 |
| FeO (Shell 105) | 2.0 | 25.9 |
| FeO (Shell 205) | 3.5 | 36.0 |
| 1% KOH on silica** | 38.0 | 50.6 |

*The value reported for adsorbtion is that observed in the discharge after the natural adsorbtion has decreased to zero.
**50 watts power, high secondary current.

What is claimed is:

1. The process of decomposing nitrogen oxides which comprises forming a dilute plasma containing same in contact with a large area of heterogeneous catalyst support solids which do not undergo irreversible reactions with the components of the plasma.

2. The process of claim 1 in which the dilute plasma is created by a discharge with a power dissipation of at least 0.1 watts/cc. of reactor space and the discharge induces some interaction of the gas components with the solids.

3. The process of claim 1 in which the nitrogen oxides are in a gas stream containing more than 5% by volume oxygen.

4. The process of claim 1 in which the nitrogen oxides are in a gas containing 0.5 to 3% oxygen, 0.5 to 3% carbon monoxide, and 0.5 to 15% carbon dioxide.

5. The process of claim 1 in which the exhaust from an automobile motor is treated.

6. The process of claim 1 in which the decomposition involves adsorption of nitrogen oxides on a solid and desorption of nitrogen and oxygen from such solids.

7. The process of claim 1 in which chemisorption is involved.

8. The process of claim 1 in which the solids are non-conductors of electricity.

9. The process of claim 1 in which the solids comprise active catalyst material.

10. The process of claim 1 in which the solids comprise metal oxides.

11. The process of claim 1 in which the solids are selected from the group consisting of aluminas, magnesias, zirconias, silicates and aluminum silicates and mixtures of the foregoing.

12. The process of claim 1 in which the solids comprise zirconium compounds.

13. The process of claim 1 in which the solids comprise thorium compounds.

14. The process of claim 1 in which metal hydroxide is deposited on the solids.

15. The process of claim 11 in which metal hydroxide is deposited on the solids.

16. The process of claim 1 in which the dilute plasma contains 80% or more nitrogen.

17. The process of claim 1 in which the dilute plasma is generated by an electric field gradient across a nitrogen oxide containing gas.

18. The process of decomposing nitrogen oxides which comprises contacting same in a dilute plasma with high surface area solids which do not undergo permanent reactions with the plasma components at space velocity of at least 500 reciprocal hours to form nitrogen from the major part of the nitrogen oxides.

19. The process of decomposing nitrogen oxides in the exhaust gases of internal combustion engines containing a small amount of same and a predominant amount of nitrogen which comprises applying energy to form a plasma therefrom in contact with a large area of solid surfaces at temperatures no greater than 1000°C and decomposing said nitrogen oxides to nitrogen and oxygen.

20. The process of claim 19 in which substantially all of the nitrogen oxides are converted to nitrogen and oxygen.

21. The process of claim 19 in which NO constitutes no more than 0.5% by volume of the gas stream.

22. The process of decomposing NO to nitrogen and oxygen which comprises applying energy to gas stream at ambient pressure to form a dilute plasma therefrom, the gas stream containing nitrogen, a small amount of NO, and no more than 5% by volume oxygen.

23. The process of decomposing nitrogen oxides which comprises passing a gaseous mixture containing a small amount of nitrogen oxides and a predominant amount of nitrogen through a narrow elongated discharge zone formed between electrodes connected to high voltage alternating current leads so as to establish a high voltage potential between the electrodes, the space between the electrodes containing substantial contact surface formed from particles of heterogeneous catalyst support solids which do not undergo irreversible reactions with the components of the gas, and forming a low temperature plasma in the gas and decomposing nitrogen oxides to nitrogen and oxygen.

24. The process of claim 23 in which the gaseous mixture contains up to about 0.5% NO, 0.5 to 3% oxygen, 5 to 15% water vapor, 5 to 15% carbon dioxide, 0.5 to 3% carbon monoxide, up to 2% hydrogen, and up to 500 parts per million hydrocarbons.

25. The process of claim 23 in which the solids are in the form of particles with dimensions of 1/32 to 1/8 inch.

26. The process of claim 25 in which the particles are essentially non-conductive.

* * * * *